June 14, 1927.
W. F. MacGREGOR
1,632,745
COMBINATION HARVESTER THRASHER
Filed Feb. 17, 1925
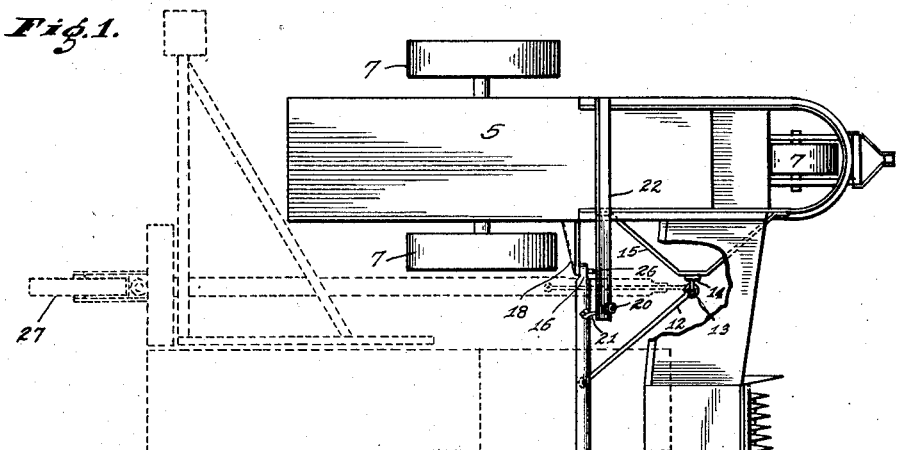
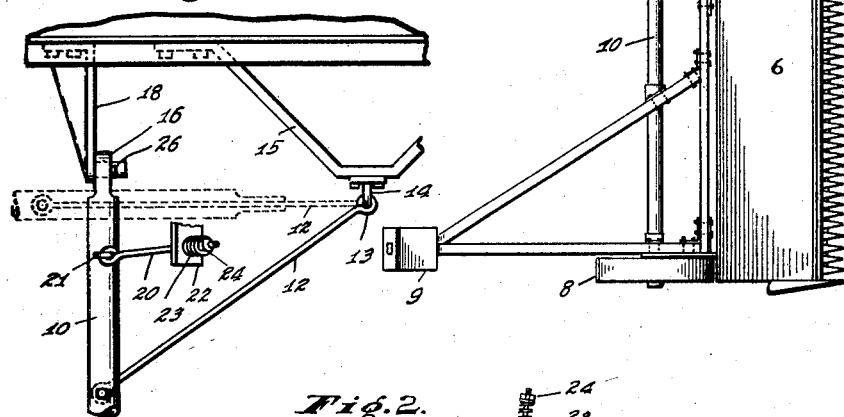
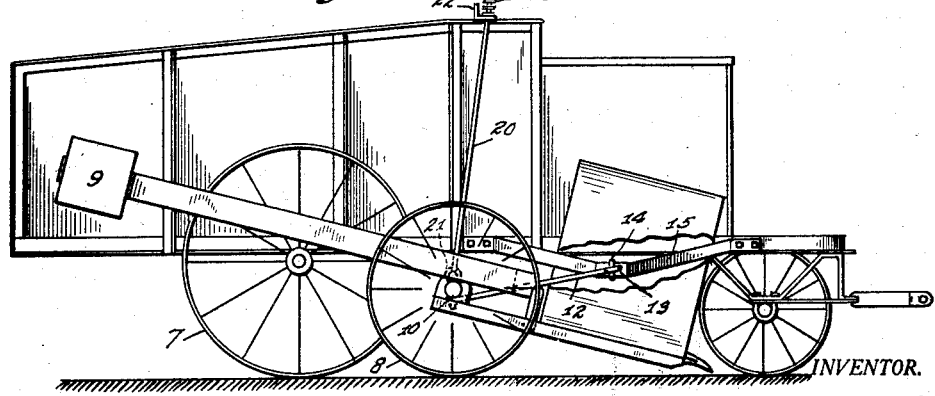
INVENTOR.
WALLACE F. MacGREGOR,
BY James A. Walsh
ATTORNEY.

Patented June 14, 1927.

1,632,745

UNITED STATES PATENT OFFICE.

WALLACE F. MacGREGOR, OF RACINE, WISCONSIN, ASSIGNOR TO J. I. CASE THRESHING MACHINE COMPANY, OF RACINE, WISCONSIN, A CORPORATION.

COMBINATION HARVESTER THRASHER.

Application filed February 17, 1925. Serial No. 9,894.

In the operation of combination harvester-thrashers it is essential that the harvester element be associated with the thrasher in a flexible manner to permit it to freely follow ground irregularities during the cutting operation in the field; and my present invention relates to a coupling for said elements whereby the harvester will be securely but yieldingly connected to permit its variable movement, and by which it may also be positioned alongside the thrasher to materially reduce the width of the machine for traveling over roads, through bridges, gates and other passageways.

In the accompanying drawing, forming part hereof, Figure 1 is a plan of a combination harvester-thrasher embodying my improvement, Fig. 2 a side elevation of the machine showing further details of said improvement, and Fig. 3 an enlarged detail of certain parts.

In said drawings the portions marked 5 and 6 indicate the thrasher and harvester respectively, supported by the usual carrying wheels, 7, 8, and provided with a counterbalancing weight, 9 and other details of construction present in such machines.

In the construction shown I preferably employ an axle, 10, upon which harvester 6 is mounted, to which axle I connect a combined brace and hinge-rod, 12, the opposite end of which is provided with a hook or eye, 13, linked to a similar device, 14, attached to a frame or brace, 15, of the thrasher, but where practicable said rod may be connected directly to the thrasher body. The inner end of the axle 10 carries a hook or eye, 16, adapted to be hingedly connected to an arm, 18, projecting from the thrasher, or may be connected directly thereto. Said axle is further yieldingly supported by a tension rod, 20, connected thereto, at 21, and which is maintained in substantially vertical position in a part of the thrasher, for example, as the projecting member, 22, which also acts as a stop for the spring, 23, coiled about said rod and which is held in position by a nut, 24, or otherwise. By means of the tension rod 20 and the brace and hinge rod 12, as will be understood, I provide a flexible connection between the thrasher and harvester, which may be connected to the axle 10 as shown, or other part of said element, so that the latter may vibrate or move vertically in its travel over uneven surfaces. When it is desired to reduce the width of the machine for transportation or storage the harvester is swung alongside the thrasher, as indicated by the dotted lines in Fig. 1, which is readily accomplished by withdrawing the pin, 26, from the hook connection, which disconnection of parts will permit the harvester to be swung horizontally about its pivotal connection, at 13, 14, the brace-rod 12 following the movement of the harvester and constantly guiding the same, as indicated by the dotted lines in Fig. 1, said hook 16, as the axle is being swung, slipping off its connection with arm 18, as will be apparent. Rod 20 supports the harvester when disconnected from the thrasher by hook 16, and when folding said harvester sustains it in such manner that the harvester together with brace 12 will be positioned in parallel relation to the thrasher and thus prevented from advancing or receding as the machine is traveling.

By substantially the arrangement disclosed it will be understood that the harvester is yieldingly connected to the thrasher in a manner to permit its free vibration while traveling, and that certain of the parts may be readily disconnected so that said harvester may be swung alongside of and in parallel relation to the thrasher. When in folded position I may secure to the outer end of axle 10 a detachable caster-wheel, 27, by which wheel 8 is lifted from the ground to prevent dragging or skidding thereof, and said harvester at its end thus carried by said caster-wheel to permit its free movement when traveling.

I claim as my invention:

1. In a combination harvester-thrasher, a coupling for said elements comprising a brace pivotally connected at one end to said harvester and at its opposite end pivotally connected to said thrasher, said coupling following the swinging movement of the harvester and occupying a position in parallel relation to the thrasher when the harvester has been folded to prevent the latter from advancing or receding when the machine is traveling, and detachable means connecting said elements to permit horizontal swinging of said harvester alongside said thrasher by said pivotally mounted coupling.

2. In a combination harvester-thrasher, a coupling for said elements comprising a brace pivotally mounted at one end of said harvester and at its opposite end pivotally connected to said thrasher, a removable hinge connecting said elements, and yielding means supported by said thrasher and connected to said harvester for sustaining the latter, when said hinge is disconnected from said thrasher.

3. In a combination harvester-thrasher, a coupling therefor pivotally connected at its ends to said harvester and to said thrasher, a hinge connecting said elements to permit vertical vibration of said harvester, and yielding means connecting said thrasher and harvester for sustaining the latter.

4. In a combination harvester-thrasher, a brace and hinge-rod pivotally connected at one end to said harvester and at its opposite end pivotally connected to said thrasher, means connecting the harvester and thrasher for sustaining said harvester in working condition in relation to said thrasher and for supporting said harvester in its swinging movement adjacent to and away from said thrasher, and disconnecting means between said elements to permit said harvester through said pivotally connected brace and hinge-rod to swing alongside and in parallel relation to said thrasher.

5. In a combination harvester-thrasher, a pivotally mounted brace and hinge-rod connecting said elements, yielding means connecting said elements in working relation and for supporting said harvester in its horizontal swinging movements, and a detachable hinge connecting said elements to permit said harvester to swing horizontally adjacent said thrasher.

6. In a combination harvester-thrasher, a coupling pivoted at one end to said harvester and at its opposite end to the thrasher to permit the harvester to swing vertically and horizontally, a hinge connection between said elements to permit the vertical movement of the harvester when in transverse relation to the thrasher, and means for disconnecting said hinge to permit the folding of the harvester alongside the thrasher, said coupling following the movement of the harvester and occupying a position parallel to the thrasher when the harvester is folded alongside thereof.

7. In a combination harvester-thrasher, a coupling comprising a brace-and-hinge rod pivotally connected at its opposite ends to said elements, a detachable hinge connection between said elements, and means connecting said thrasher and harvester for sustaining the latter when said hinge is disconnected.

In testimony whereof I affix my signature.

WALLACE F. MacGREGOR.